(12) United States Patent
Talukdar (10) Patent No.: US 12,304,694 B2
(45) Date of Patent: May 20, 2025

(54) MODULAR AND REUSABLE PACKAGING SYSTEM

(71) Applicant: Aadrit Talukdar, San Jose, CA (US)

(72) Inventor: Aadrit Talukdar, San Jose, CA (US)

( * ) Notice: Subject to any disclaimer, the term of this patent is extended or adjusted under 35 U.S.C. 154(b) by 67 days.

(21) Appl. No.: 18/452,604

(22) Filed: Aug. 21, 2023

(65) Prior Publication Data
US 2024/0067399 A1 Feb. 29, 2024

Related U.S. Application Data

(60) Provisional application No. 63/402,471, filed on Aug. 31, 2022.

(51) Int. Cl.
*B65D 21/08* (2006.01)
*B65D 13/00* (2006.01)
*B65D 55/10* (2006.01)

(52) U.S. Cl.
CPC ........... *B65D 21/083* (2013.01); *B65D 13/00* (2013.01); *B65D 55/10* (2013.01); *B65D 2203/10* (2013.01)

(58) Field of Classification Search
CPC ............... B65D 88/005; B65D 81/361; B65D 21/00–083; B65D 13/00; B65D 55/10; B65D 2203/10; B65D 11/10; B65D 11/1873; B65D 11/20
See application file for complete search history.

(56) References Cited

U.S. PATENT DOCUMENTS

| | | | |
|---|---|---|---|
| 2,960,249 A | 11/1960 | Walsh | |
| 4,461,395 A | 7/1984 | Burnett | |
| 5,076,454 A | 12/1991 | Garton | |
| 5,413,236 A | 5/1995 | Paul | |
| 5,765,707 A | 6/1998 | Paul | |
| 5,816,425 A | 10/1998 | Paul | |
| 5,996,828 A * | 12/1999 | Cheyn | B65D 11/1873 220/4.31 |
| 8,689,992 B2 * | 4/2014 | Anderson | A47C 7/628 220/4.31 |
| 9,422,087 B1 | 8/2016 | Poran | |
| 9,714,113 B2 | 7/2017 | Jung | |
| 10,207,833 B2 | 2/2019 | Cheng | |
| 11,273,956 B2 | 3/2022 | Thomas | |
| 11,655,068 B2 | 5/2023 | Pruvost | |
| 2018/0186511 A1 * | 7/2018 | Sullivan | B65D 9/12 |
| 2018/0328030 A1 * | 11/2018 | Walter | E04B 2/18 |
| 2020/0122883 A1 | 4/2020 | Ajamian | |
| 2020/0190837 A1 * | 6/2020 | Xia | E04H 1/1205 |
| 2021/0188480 A1 * | 6/2021 | Pruvost | B65D 21/083 |
| 2022/0281639 A1 | 9/2022 | Ismert | |

* cited by examiner

*Primary Examiner* — Kareen K Thomas
(74) *Attorney, Agent, or Firm* — Lewellyn Law, PLLC; Stephen Lewellyn (57) ABSTRACT

A modular and reusable packaging system has a plurality of interconnecting pieces. The pieces have a rigid construction and are configured to connect with adjacent pieces to form the walls of the shipping container. The system also has a closure piece having a locking mechanism configured to releasably engage with at least two of the plurality of pieces when the locking mechanism is operated to securely lock the pieces together. Container forming pieces may have tracking devices that can be used to track location and use, for example. The tracking device may be an RFID tag attached to one or more of the plurality of pieces.

18 Claims, 13 Drawing Sheets

MODULAR AND REUSABLE PACKAGING SYSTEM

REFERENCE TO RELATED APPLICATIONS

This application claims the benefit of U.S. Provisional Application Ser. No. 63/402,472, filed Aug. 31, 2022, the entirety of which is incorporated herein by reference.

TECHNICAL FIELD

The present disclosure relates generally to packaging containers for shipping goods and, more particularly, to a modular and reusable packaging system for shipping goods.

BACKGROUND

Containers, such as cardboard containers, are well known and widely used for shipping goods. The cardboard containers are primarily intended for single use and then recycled or otherwise disposed of. Even though many of these containers are recycled, they still account for a major portion of municipal solid waste according to the US Environmental Protection Agency, amounting to millions of tons making its way to landfills.

Packaging waste has increased substantially with the steady growth of ecommerce (online shopping) by consumers. In essence, more online sales mean more packaging, leading to more packaging waste. Overpackaging has become a large contributor to packaging waste. Overpackaging is when excess materials are used to ship goods. Commonly, this happens when an oversized container is used to ship goods and filler material, such as inflated plastic bags, packing peanuts, or the like, are used to fill the space in the oversized container to prevent damage to the goods during shipping. In addition to the environmental impact, overpackaging leads to increased company costs and negative consumer experience.

Packaging used in today's shipping is not designed with sustainability in mind. Rather, as mentioned above, today's packaging is typically considered single-use and once used it is disposed of. Consumers and companies alike are beginning to demand more environmentally friendly shipping options because of the waste produced by single-use packaging and overpackaging practices. Accordingly, there is a need and a desire for more environmentally friendly packaging solutions that are not single-use and can prevent overpackaging.

SUMMARY

The present disclosure provides a modular and reusable packaging system that overcomes the disadvantages in packaging now existing.

In embodiments, the modular and reusable packaging system provides a solution to overpackaging practices by providing containers that are assembled by a plurality of interconnecting pieces that can be arranged to create containers of different sizes and shapes to accommodate the articles to be shipped within the container. Users can customize container sizes, shapes, and functionalities to create a tailored solution that perfectly suits their specific shipping needs.

In embodiments, the modular and reusable packaging system provides a solution to single-use shipping containers by providing containers that are assembled by a plurality of interconnecting pieces that are reusable. The container system described herein significantly reduces waste and environmental impact. Unlike traditional single-use packaging, these containers can be used repeatedly, contributing to a substantial decrease in plastic waste and resource consumption.

In embodiments, the modular and reusable packaging system provides a system that reduces costs overtime. The initial investment in high-quality, durable containers pays off quickly as the need for constant replacement diminishes. Additionally, streamlined logistics and efficient use of space contribute to reduced operational costs.

In embodiments, the modular and reusable packaging system provides a container system constructed with durability in mind, providing enhanced protection for the goods they hold.

In embodiments, the modular and reusable packaging system provides a modular system that is easy to use and has a standardized design. This saves valuable time in busy supply chain operations, as workers can quickly and efficiently handle containers without the need for specialized equipment or extensive training.

In embodiments, a modular and reusable packaging system has a plurality of interconnecting pieces. The pieces have a rigid construction and may be constructed from a plastic material, for example. The pieces are configured to connect with adjacent pieces to form the walls of the shipping container. The system also has a closure piece having a locking mechanism configured to releasably engage with at least two of the plurality of pieces when the locking mechanism is operated to securely lock the pieces together.

In aspects, each of the pieces can be configured to connect with adjacent pieces by interlocking protrusions and corresponding recesses, wherein at least one protrusion of one piece is configured to mate with at least one recess of an adjacent piece, allowing secure connection of the pieces to form the walls of the shipping container.

In aspects, the locking mechanism may have locking bars that extend outwardly from opposite side edges of the closure piece. The locking bars are slidably connected to the closure piece for back-and-forth movement in a direction perpendicular to side edges of the closure piece between retracted and extended positions. An actuator is operatively connected to the locking bars and is operable to move the locking bars between the extended and retracted positions. When the locking bars are in the extended position terminal ends of each locking bar are engaged with at least one piece of the plurality of pieces thereby locking the at least one piece to at least one other piece.

In aspects, container forming pieces may have tracking devices that can be used to track location and use, for example. In aspects, a tracking device may be an RFID tag attached to one or more of the plurality of pieces.

Numerous additional objects, features, and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages, and the specific objects attained by its uses, reference should be had to the accompanying drawings and descriptive matter in which there are illustrated embodiments of the invention.

DETAILED DESCRIPTION

This description and the accompanying drawings that illustrate inventive aspects, embodiments, implementations, or applications should not be taken as limiting the claims define the protected invention. Various mechanical, structural, and operational changes may be made without departing from the spirit and scope of this description and the claims. In some instances, well-known devices, structures, or techniques have not been shown or described in detail in order not to obscure the invention Like reference numbers in two or more figures represent the same or similar elements.

Although this description is made to be sufficiently clear, concise, and exact, scrupulous, and exhaustive linguistic precision is not always possible or desirable, since the description should be kept to a reasonable length and skilled readers will understand background and associated technology.

In addition, the singular forms "a", "an", and "the" are intended to include the plural forms as well, unless the context indicates otherwise. And the terms "comprises", "includes", "has", and the like specify the presence of stated features, steps, operations, elements, and/or components but do not preclude the presence or addition of one or more other features, steps, operations, elements, components, and/or groups.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different locations (i.e., translational placements) and orientations (i.e., rotational placements) of a device in use or operation in addition to the location and orientation shown in the figures. For example, if a device in the figures is turned over, elements described as "below" or "beneath" other elements or features would then be "above" or "over" the other elements or features. Thus, the exemplary term "below" can encompass both locations and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes include various special device locations and orientations.

Figure 1:
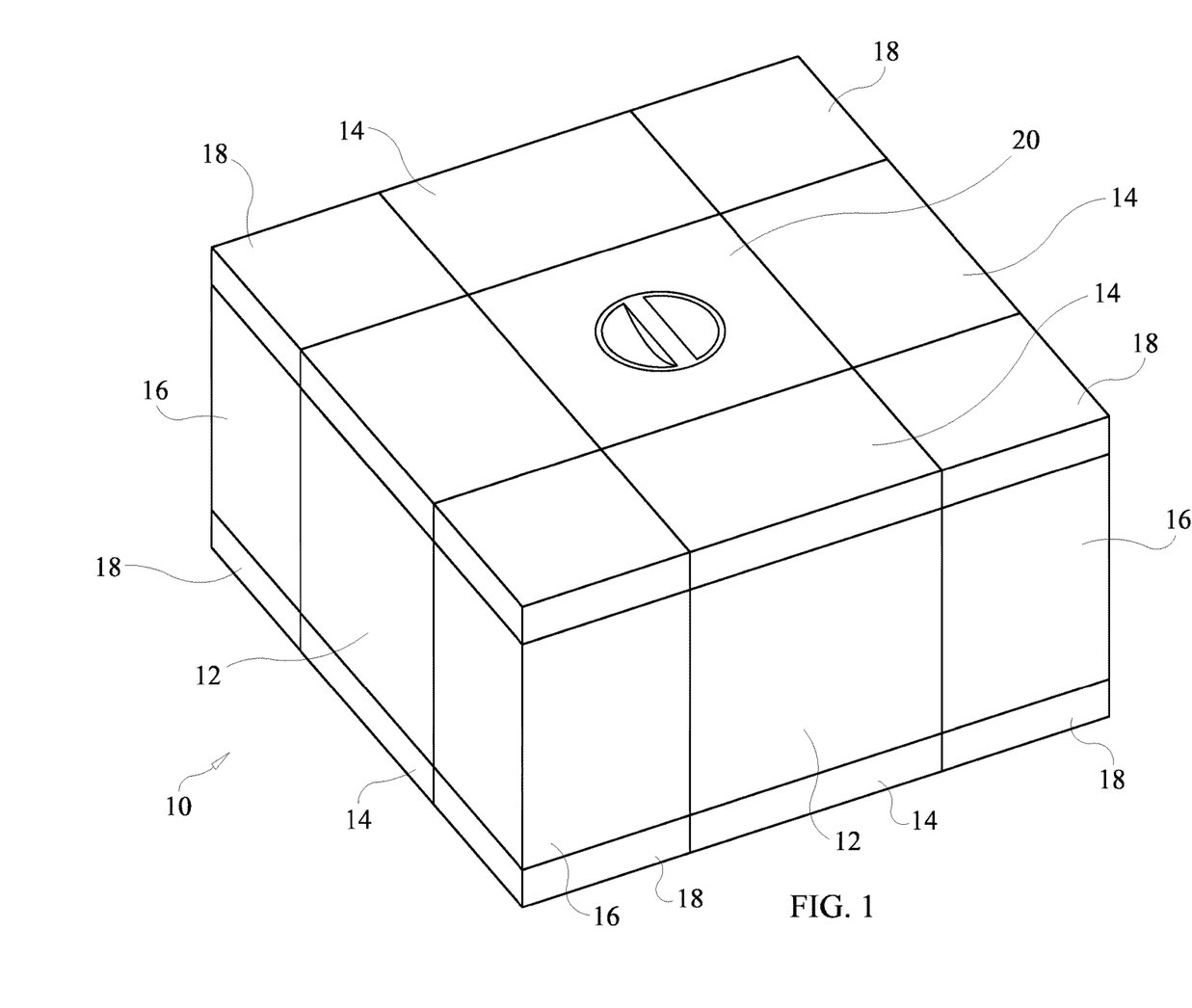
FIG. 1 is a perspective view of a modular and reusable container system according to an embodiment of the invention.
Figure 2:
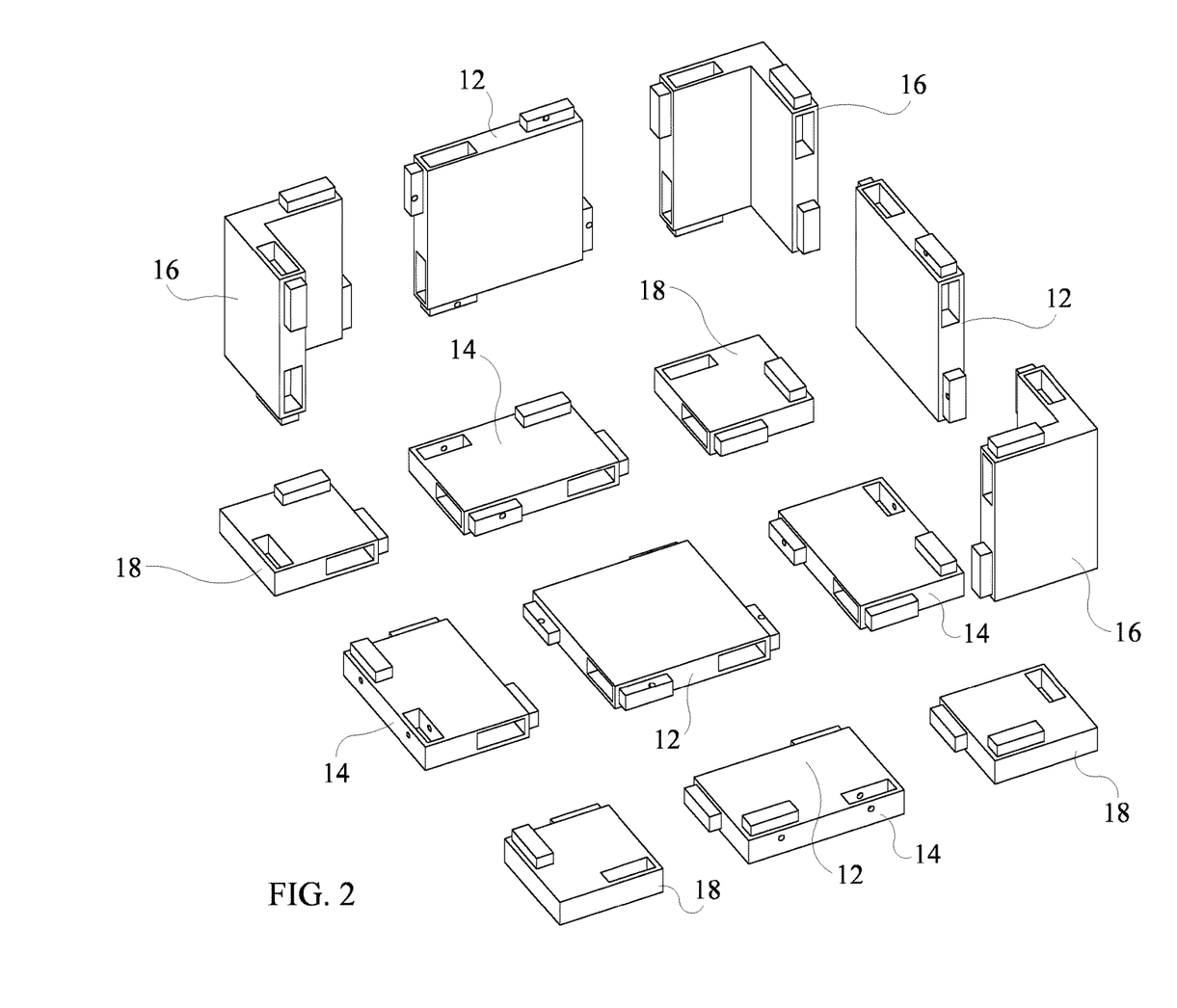
FIG. 2 is an exploded perspective of the modular and reusable container system.

With reference to the figures of the drawings, at least one embodiment of the invention is shown and will be described. In FIG. 1 there is shown a perspective view of a modular and reusable container 10 according to an embodiment of the invention. In FIG. 2 there is shown a perspective, exploded view of the container without three sides for clarity. Container 10 has a modular construction comprising of a plurality of separate pieces that are assembled to form the container. The modular construction allows the container to be easily assembled and disassembled. The modular construction further allows the container to be assembled into various sizes and shapes as desired to accommodate various sized goods to be shipped within the container and is not limited to the shape and size as shown in the drawings.

As shown, container 10 is assembled by a plurality of pieces that are connected to form the box-shaped container. The pieces include several differently shaped pieces, which include primary wall pieces 12, edge pieces 14, L-shaped corner pieces 16, corner edge pieces 18, and one or more lid or closure piece 20 having a locking mechanism. The pieces are configured to connect with adjacent pieces by interlocking protrusions and corresponding recesses, wherein at least one protrusion of one piece is configured to mate with at least one recess of an adjacent piece, allowing secure connection of the pieces to form the walls of the shipping container.

Figure 3:
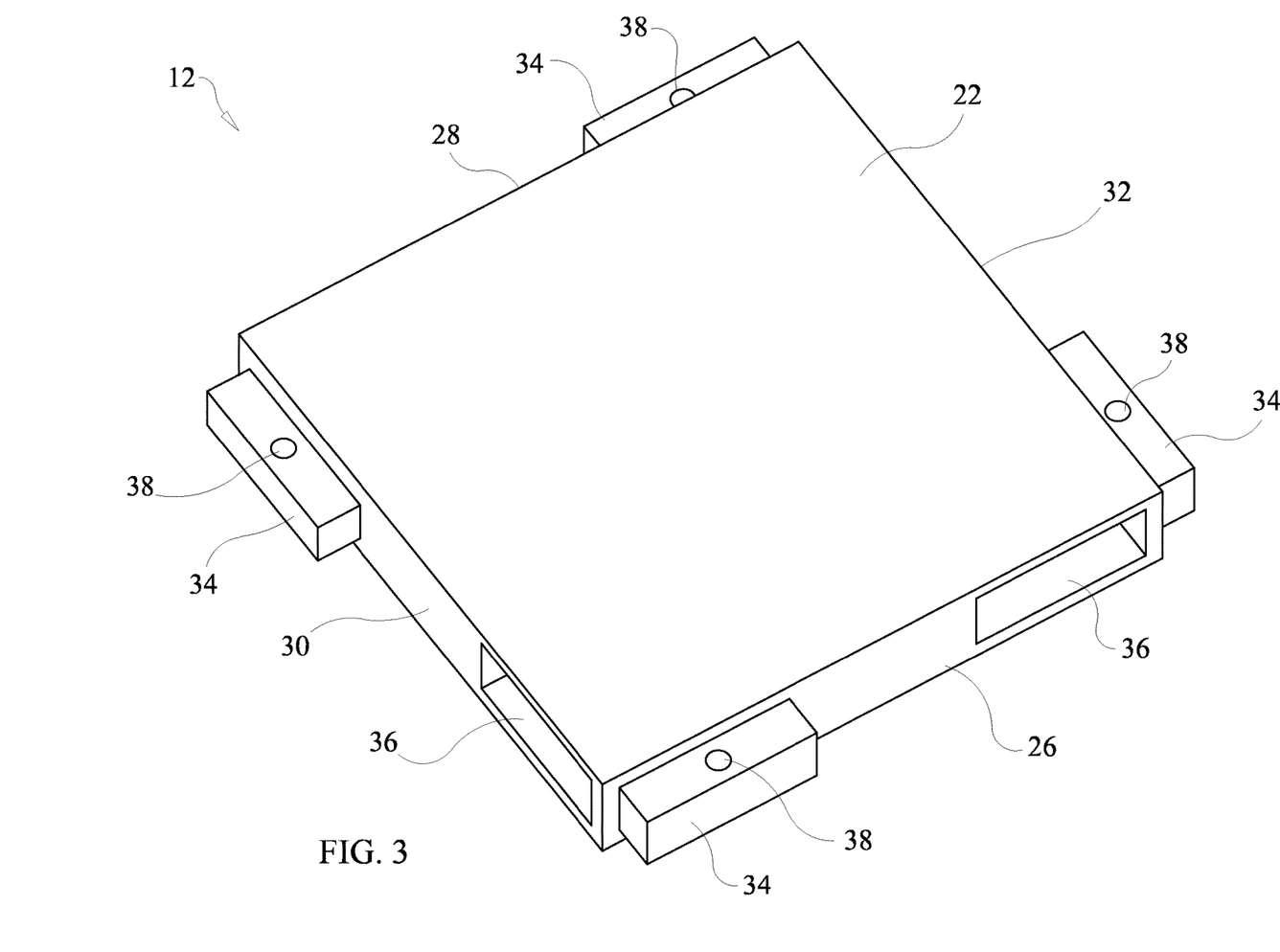
FIGS. 3 and 4 are perspective views of a primary wall piece of the modular and reusable container system according to an embodiment of the invention.
Figure 4:
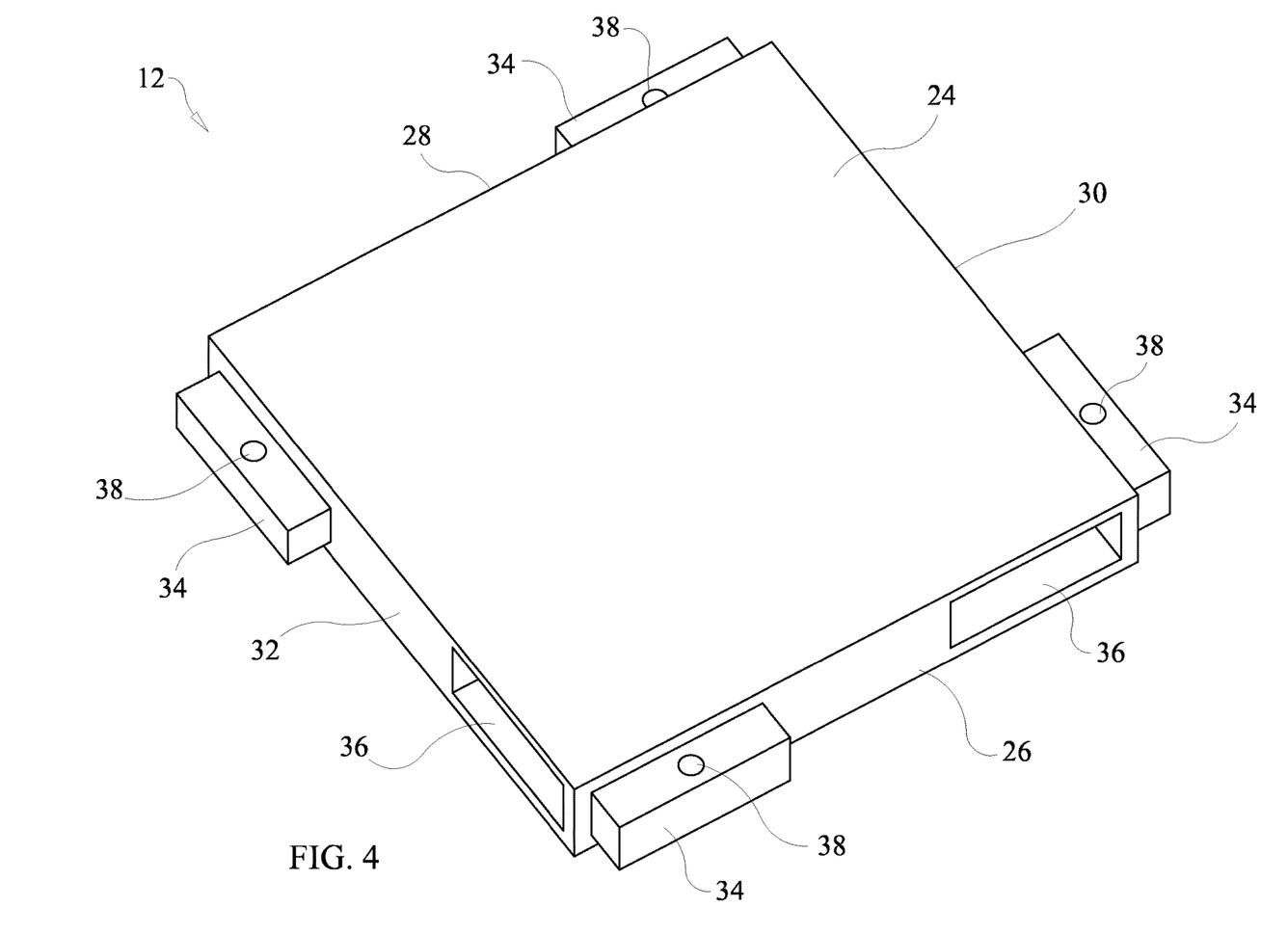

In FIGS. 3 and 4, primary wall piece 12 is shown according to an embodiment of the invention. Primary wall piece 12 has parallel, opposite broad surfaces 22 and 24, opposite, parallel edges 26 and 28, and opposite, parallel edges 30 and 32. Piece 12 has at least one protrusion 34 and at least one recess 36 on each edge 26, 28, 30, and 32 as shown. As further shown, and as will be described herein in more detail below, protrusions 34 may have through holes 38 that may be used to lock assembled pieces together by the locking mechanism on closure piece 20.

Figure 5:
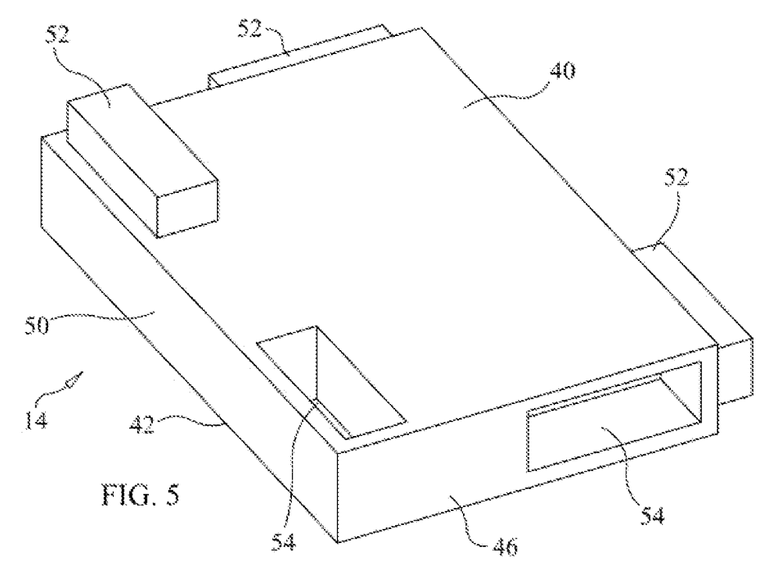
FIGS. 5 and 6 are perspective views of an edge piece of the modular and reusable container system according to an embodiment of the invention.
Figure 6:
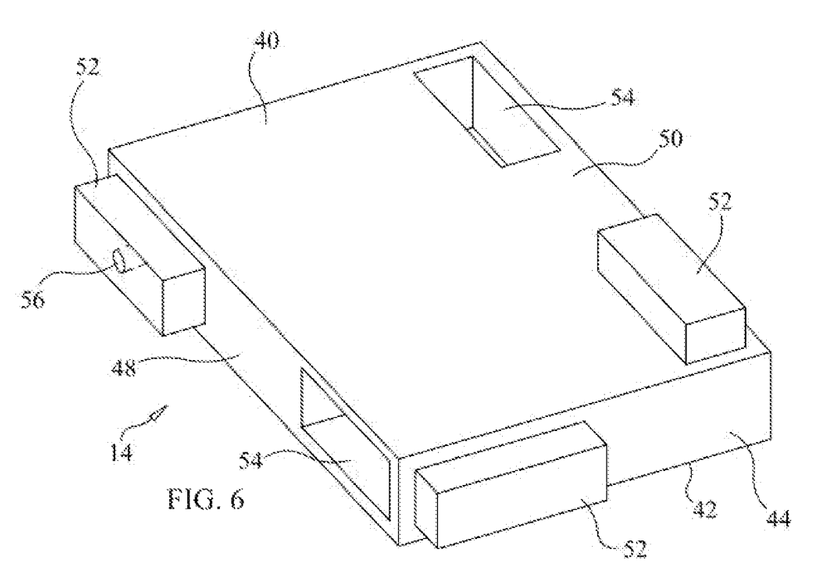

In FIGS. 5 and 6, an edge piece 14 is shown according to an embodiment of the invention. Edge piece 14 has parallel, opposite, broad surfaces 40 and 42, opposite, parallel edges 44 and 46, and opposite, parallel edges 48 and 50. Piece 14 has several protrusions 52 and recesses 54 facilitating its connection with adjacent pieces. As shown, there is protrusion on edge 44, on edge 48, and on surface 40 disposed approximate edge 50. As shown, there is a recess 54 on edge 46, a recess on edge 48, and a recess 54 on surface 40. Piece 14 may have a hole 56 that extends through the face of protrusion 52 on edge 48 to the recess 54 on surface 42. Like holes 38 of piece 12, hole 56 may be used to lock assembled pieces together by the locking mechanism on closure piece 20.

Figure 7:
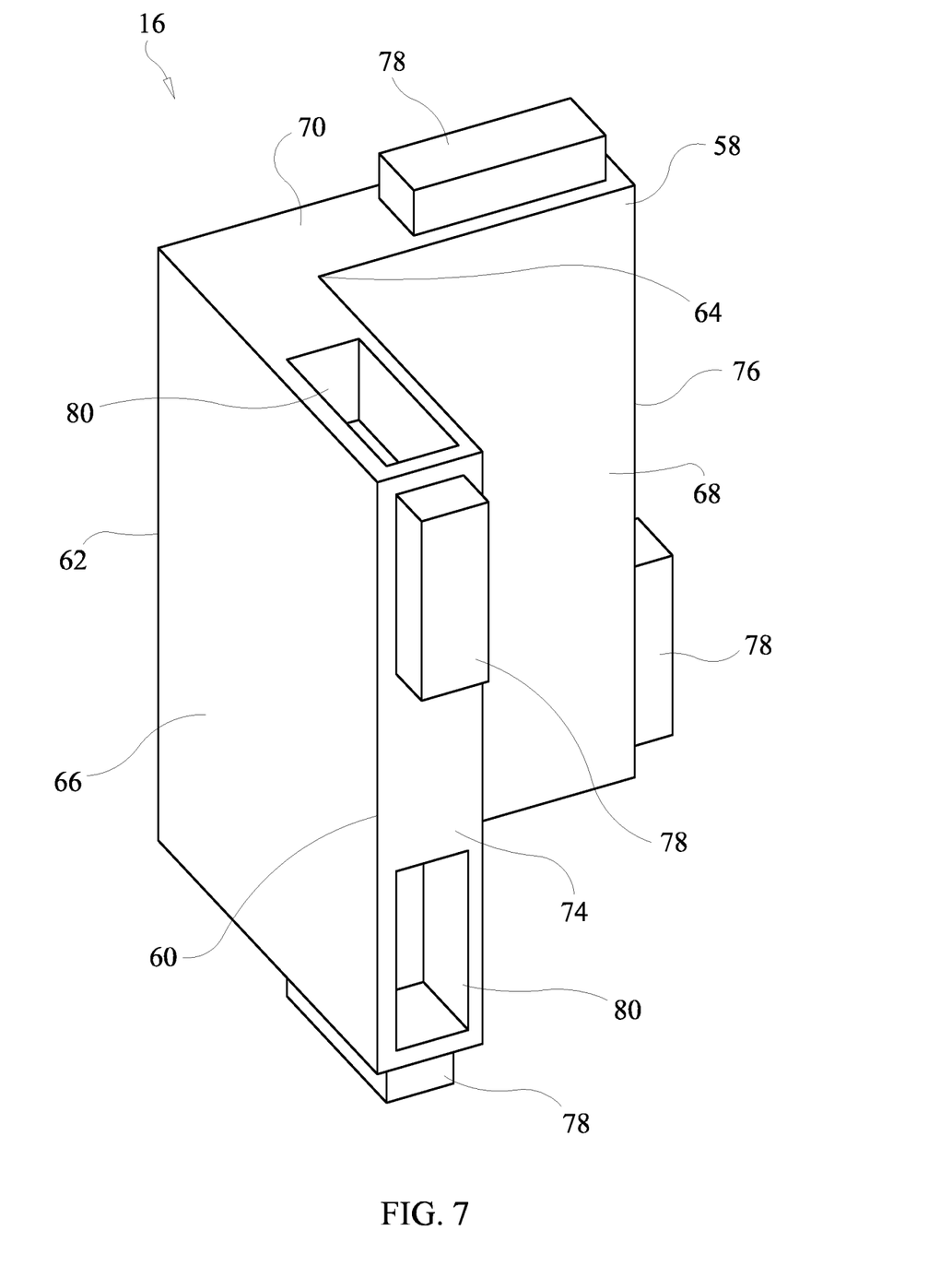
FIGS. 7 and 8 are perspective views of an L-shaped corner piece of the modular and reusable container system according to an embodiment of the invention.
Figure 8:
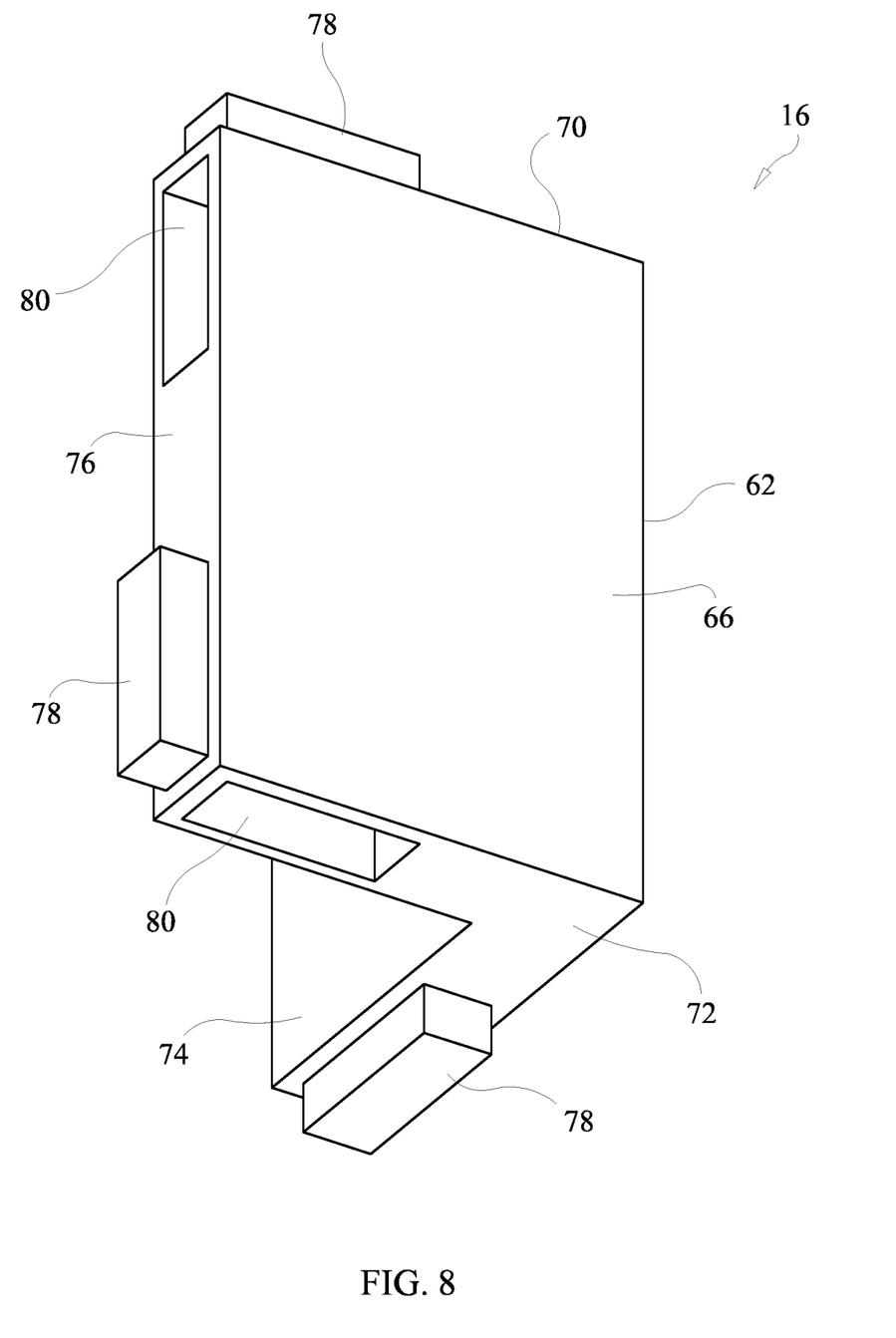

In FIGS. 7 and 8, an L-shaped corner piece 16 is shown according to an embodiment of the invention. Piece 16 has a first portion 58 and a second portion 60 that are perpendicular to one another and form an outside corner edge 62 and an oppositely disposed inside corner edge 64. Piece 16 has an outer surface 66 and an opposite inner surface 68, opposite parallel edges 70 and 72, and longitudinal edges 74 and 76. A protrusion 78 and a recess 80 is disposed on each edge 70 and 72, and on each edge 74 and 76 as shown.

Figure 9:
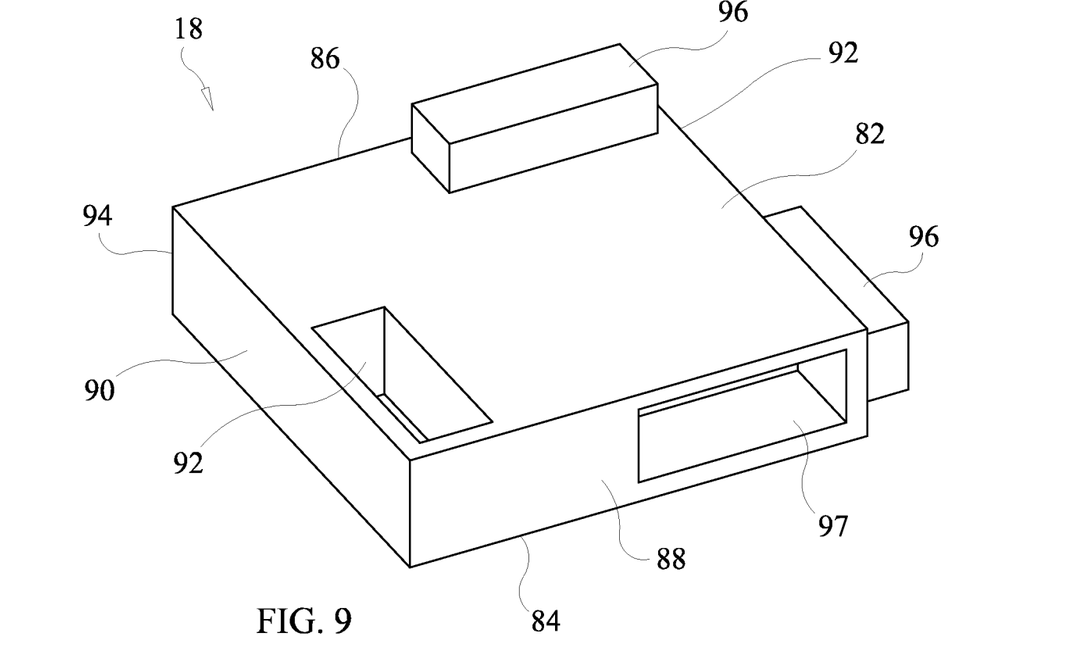
FIGS. 9 and 10 are perspective views of a corner edge piece of the modular and reusable container system according to an embodiment of the invention.
Figure 10:
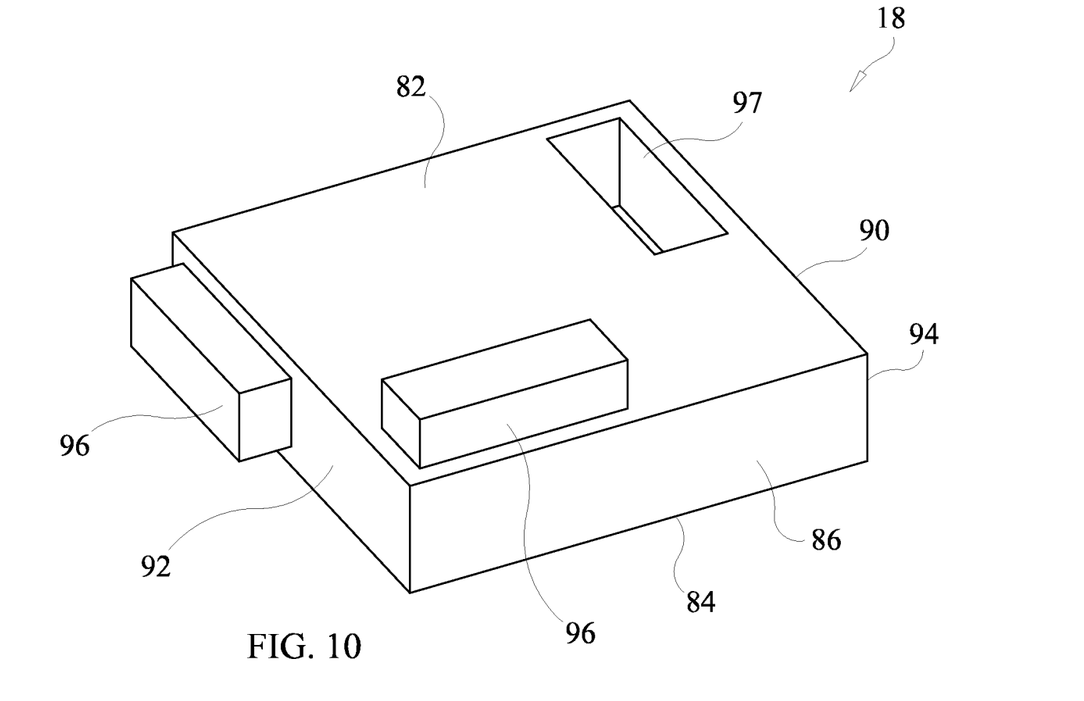

In FIGS. 9 and 10, a corner edge piece 18 is shown according to an embodiment of the invention. Piece 18 parallel, opposite broad surfaces 82 and 84, opposite, parallel edges 86 and 88, and opposite, parallel edges 90 and 92. Edges 86 and 90 connect at an outside corner edge 94. Piece 18 has a protrusion 96 on edge 92 and a protrusion on surface 82 disposed along edge 86. Piece 18 has a recess 97 on edge 88 and a recess 97 on surface 82 disposed along edge 90.

Figure 11:
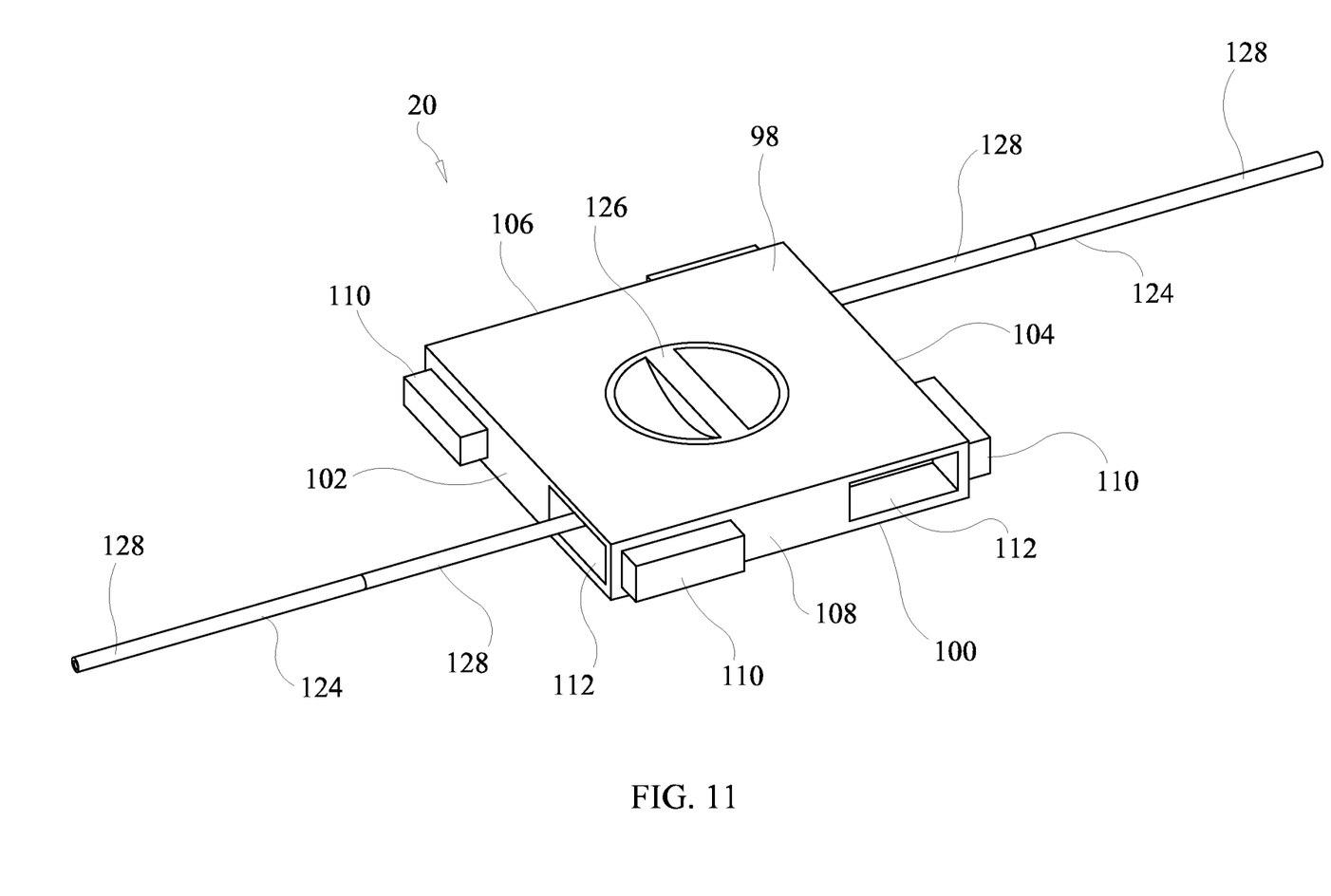
FIGS. 11 and 12 are perspective views of a lid or closure piece of the modular and reusable container system according to an embodiment of the invention.
Figure 12:
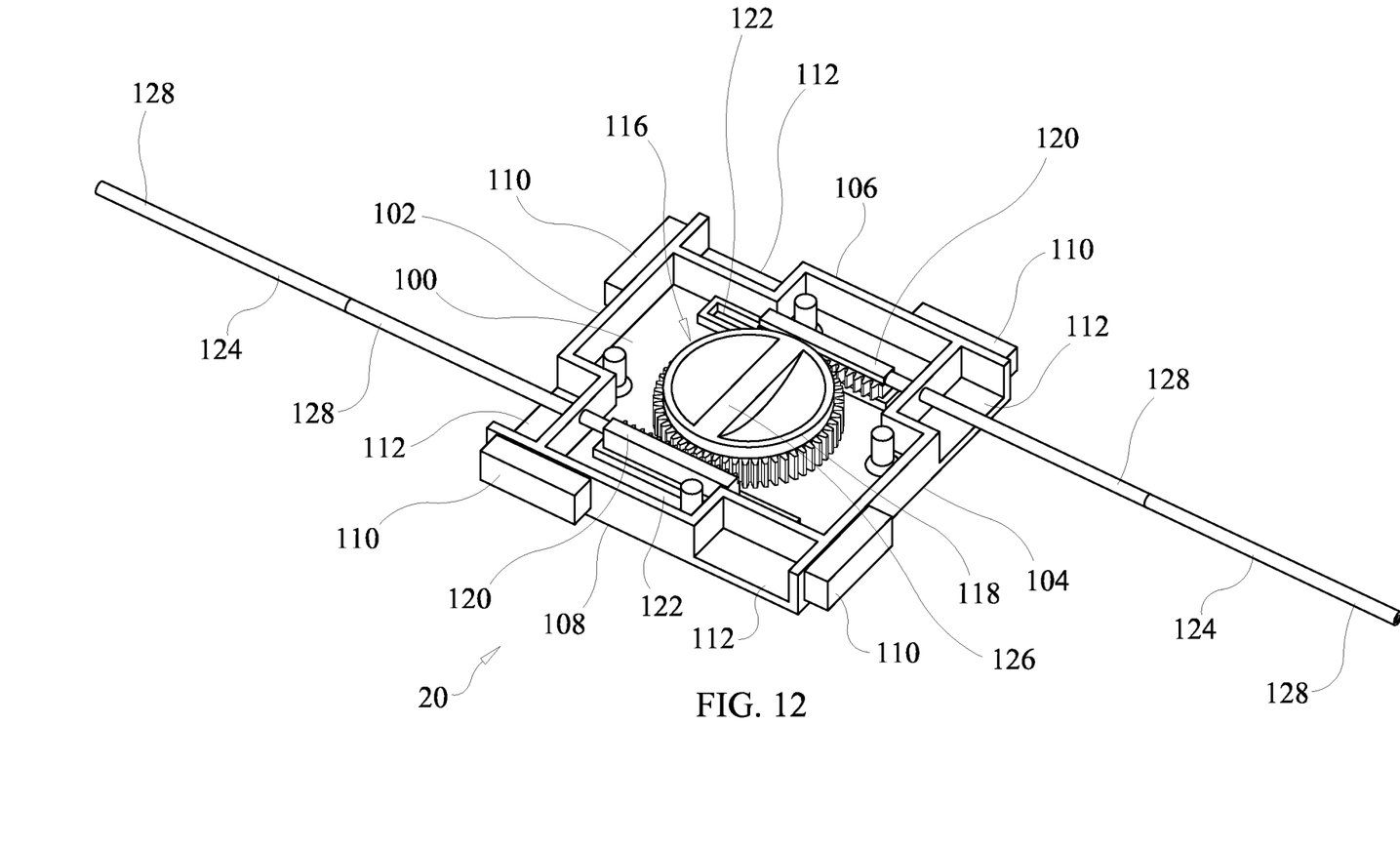

In FIGS. 11 and 12, a lid or closure piece 20 is shown according to an embodiment of the invention. In FIG. 12, the closure piece is shown with a surface removed to illustrate internally disposed components. Closure piece 20 is shaped like wall piece 12 and further has a locking mechanism that is operated to lock pieces of a container together. Like wall piece 12, closure piece 20 has parallel, opposite broad surfaces 98 and 100, opposite, parallel edges 102 and 104, and opposite, parallel edges 106 and 108. Piece 20 has at least one protrusion 110 and at least one recess 112 on each edge 102, 104, 106, and 108 as shown.

Piece 20 has an internal space 114 in which a locking mechanism 116 is housed. Locking mechanism 116 has a pinion gear 118, at least one gear rack 120, and at least one locking rod 124. Pinion gear 118 is rotatably attached to piece 20, at its center, for rotation about an axis that extends perpendicularly to the broad surfaces 98 and 100. As shown, two gear racks 120 are disposed on opposite sides of pinion gear 118 and are meshed with the pinion gear. Each rack 120 is slidingly held in respective channels 122 for back-and-forth linear movement along a direction that extends between edges 102 and 104.

As further shown, a locking rod 124 is attached to each rack 120 and extends outwardly from its respective rack through a respective edge 102 and 104 and generally perpendicular therewith. As representatively shown, rods 124 extend through the recesses 112 on edges 102 and 104. Rods 124 may be removably connected to its respective rack 120 by a threaded connection wherein a threaded stud may be located on an end of a rod that is threaded into a corresponding threaded bore on the rack.

Gear racks 120 are operatively connected to pinion gear 118 such that rotating the pinion gear in one direction causes the racks and attached rods to move in an outward direction toward one respective edge 102, 104. And rotating the pinion gear 118 in the opposite direction causes the racks and attached rods to move in an inward direction away from one respective edge. The former being an extended position, locked position, and the latter being a retracted, unlocked position.

The pinion gear 118 may also have a knob 126 that is accessible through one broad surface of piece 20, such as surface 98. Knob 126 is configured to be grasped by a user to rotate the pinion gear 118 to position the rods 124 between the retracted, unlocked position and the extended, locked position.

Figures 13, 14:
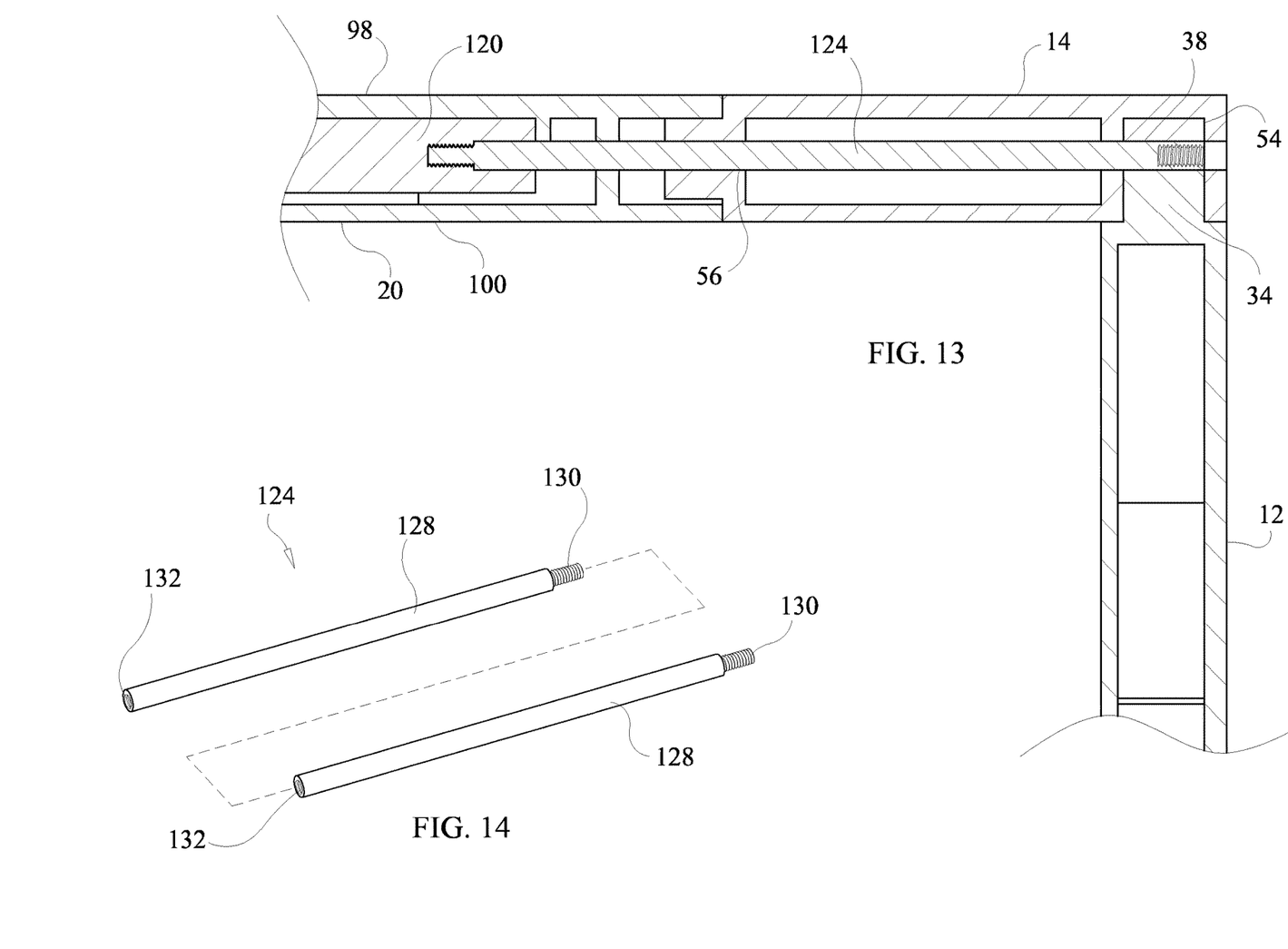
FIG. 13 is a partial cross-sectional view showing pieces locked together by a locking mechanism according to an embodiment of the invention.
FIG. 14 is a perspective, exploded view of a locking rod of the locking mechanism according to an embodiment of the invention.

In FIG. 13, there is a partial cross section of container 10 shown with the locking mechanism in a locked configuration. The opposite side, not shown in this Figure, is similarly arranged. As shown here, closure piece forms part of a wall of the container, such as a top wall of the container. Locking rod 124 extends outwardly from closure piece 20 and through an adjacent wall forming piece that is matted with the closure piece to form the top wall, representatively an edge piece 14. The locking rod 124 aligns with and extends through hole 56 of the edge piece 14 and into a respective recess 54. A wall piece 12 forming a container wall, such as a sidewall, that is perpendicular to the top wall is matted with the edge 14 with one of its protrusions 34 disposed on the recess 54 of the edge piece. As further shown, the locking rod 124 extends through hole 38 in the protrusion 34 located in the recess 54. To this end, locking rod 124 prevents the protrusion 34 from being removed from the recess 54, thereby locking the pieces together. To unlock the pieces, an operator may rotate the pinion gear 118 by grasping knob 126 to move the locking rod 124 into the retracted, unlocked position where it withdraws from hole 38, allowing the protrusion 34 to be removed from the recess 54.

While not shown, an anti-tamper device such as a combination lock, a snap lock, and/or a tamper evident adhesive seal, for example, could be used to stop rotation of the knob to prevent unwanted tampering and/or operation of the locking mechanism and opening the container.

Locking rod 124 may be constructed of removably connected rod segments 128. Such a construction allows for the length of the rod to be adjusted to the size of the container. Adding more rod segments increases the rod length and removing rod segments decreases the rod length. While rod 124 is representatively shown with two segments 128, it is not limited in any way to only two segments.

In FIG. 14 there is shown a rod 124 with segments 128 disconnected. Representatively, rods 124 can be removably connected by a threaded stud to threaded bore type connection, wherein a threaded stud 130 is located on one end and a threaded bore 132 is located on an opposite end. This arrangement allows the segments to be connected and disconnected in a daisy-chain fashion to adjust the rod length as desired to correspond to container size.

Figure 15:
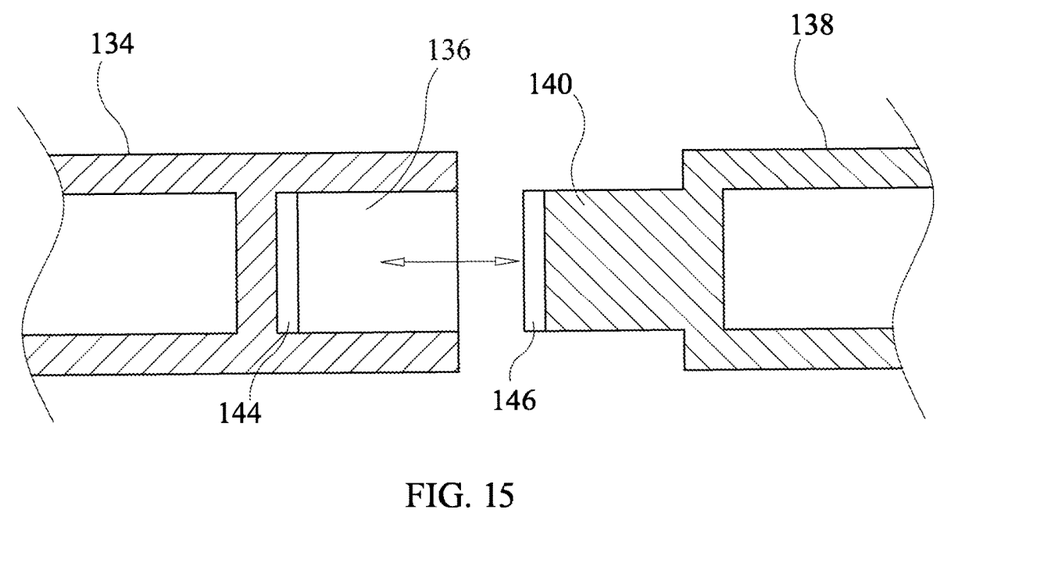
FIG. 15 is a partial cross-section view through two representative pieces showing a mechanical fastening between the two pieces and the two pieces not connected.
Figure 16:
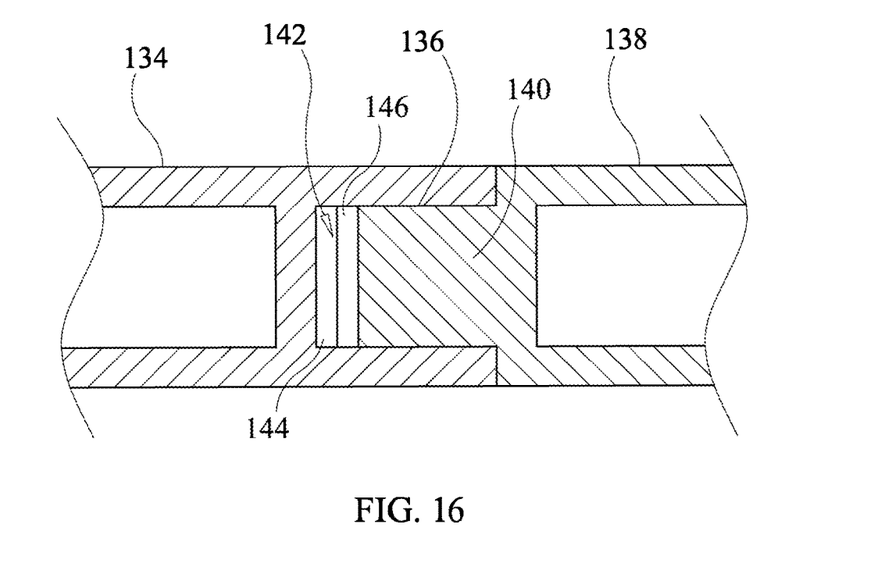
FIG. 16 is a partial cross-section view through two representative pieces showing a mechanical fastening between the two pieces and the two pieces being connected.

With reference to FIGS. 15 and 16, in aspects the various pieces forming the container can be further secured together by touch fasteners. Here, container assembly pieces, such as those discussed above, are representatively shown as piece 134 having a recess 136 and piece 138 having a protrusion 140. These pieces should be considered representative of any of the forgoing described pieces. As shown, touch fastener 142 having mating portions 144 and 146 is used to further secure the protrusion 140 in recess 136. One mating portion 144 is attached to a wall of the recess 136 and the other mating portion 146 is attached to a surface of the protrusion 140, such that when the protrusion is inserted into the recess, the two mating portions engage and releasably couple the pieces together via the connection. The pieces can be disconnected, that is the protrusion 140 removed from the recess 136 by pulling the pieces apart with a sufficient force to overcome the engagement strength of the mating portions 144 and 146 of the touch fastener 142.

While touch fasteners, such as the hook-and-loop or the like, are preferred, other types of fastening could be used. For example, adhesives could be used in place of the touch fastener. The adhesives should be releasable adhesives, such as, for example stretch release type adhesives. Other mechanical fasteners and/or fastening systems could also be used to prevent unwanted disconnection between a mated protrusion-recess pair.

Figure 17:
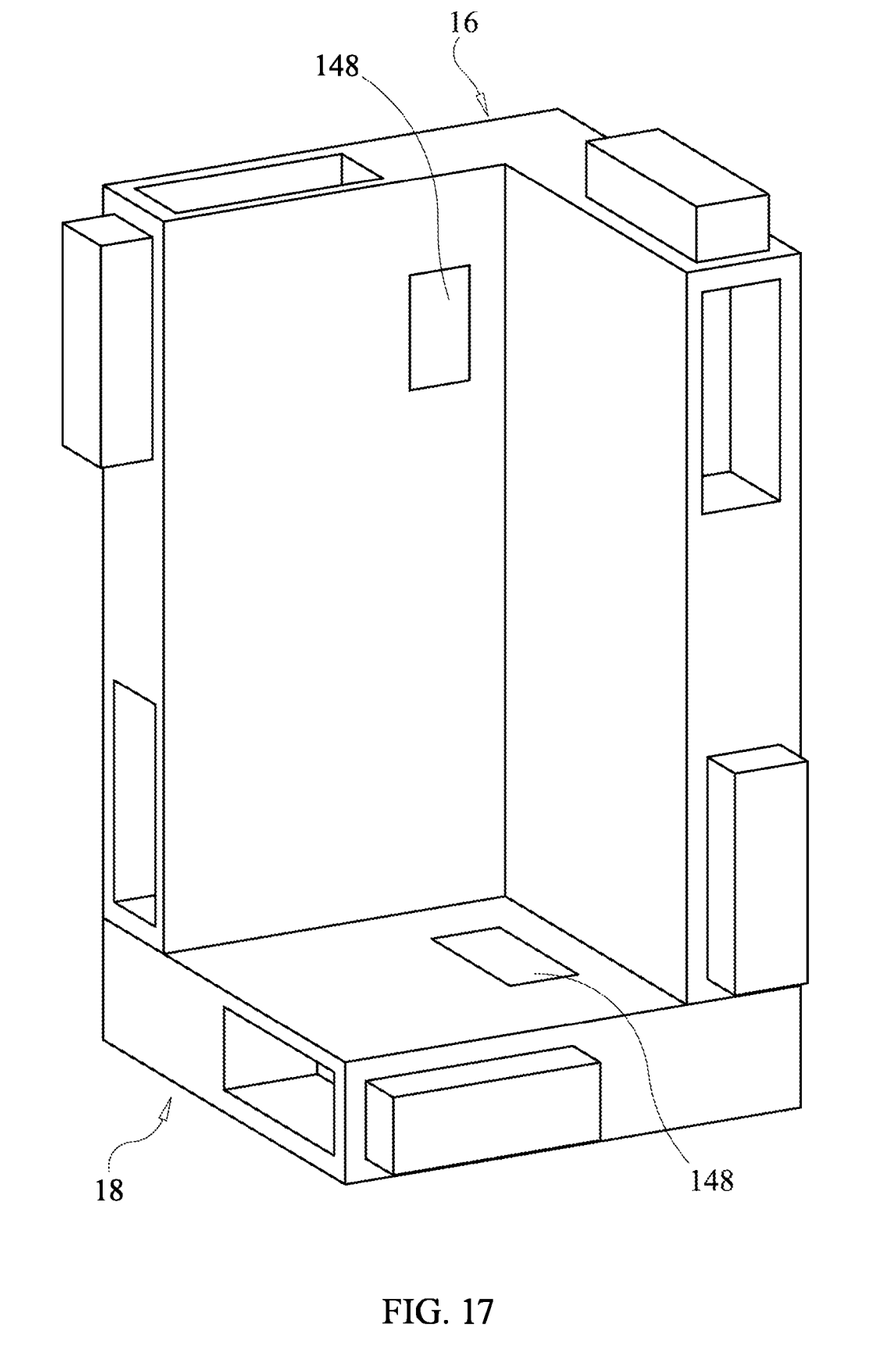
FIG. 17 is a perspective view of two pieces connected showing the pieces having a tracking device.

In an aspect, as shown in FIG. 17, one or more assembly pieces, representatively shown here as pieces 16 and 18, can have a tracking device 148. The tracking device 148 can be used to track the use of the piece to which it is attached. Tracking information such as the number of times a piece is used can be helpful to determine the service life of the piece, among other factors. One or more tracking devices 148 in an assembled container can be used to track shipping progress, either automatically or manually. In aspects, the tracking device 148 can be a nearfield device, such as an RFID tag that can be read by a reader, both known in the art.

While the disclosure has been illustrated and described in detail in the drawings and foregoing description, such illustration and description are to be considered exemplary and not restrictive in character, it being understood that illustrative embodiments have been shown and described and that all changes and modifications that come within the spirit of the disclosure are desired to be protected. It will be noted that alternative embodiments of the present disclosure may not include all the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A modular and reusable shipping container comprising:
   a plurality of pieces, each having a rigid construction and being configured to connect with adjacent pieces to form walls of the shipping container;
   a closure piece having a locking mechanism, the locking mechanism configured to releasably engage with at least two of the plurality of pieces when the locking mechanism is operated to securely lock the pieces together;
   wherein the locking mechanism comprises:
   first and second locking bars extending outwardly from opposite side edges of the closure piece, the first and second locking bars are slidably connected to the closure piece for back-and-forth movement in a direction perpendicular to the side edges between retracted and extended positions;
   an actuator mounted to the closure piece, the actuator operatively connected to the first and second locking bars, the actuator operable to move the first and second locking bars between the extended and retracted positions; and
   wherein when the first and second locking bars are in the extended position terminal ends of each locking bar are engaged with at least one piece of the plurality of pieces thereby locking the at least one piece to at least one other piece.

2. The modular and reusable shipping container of claim 1, wherein each of the pieces are configured to connect with adjacent pieces by interlocking protrusions and corresponding recesses, wherein at least one protrusion of one piece is configured to mate with at least one recess of an adjacent piece, allowing secure connection of the pieces to form the walls of the shipping container.

3. The modular and reusable shipping container of claim 2, further comprising:
   a plurality of touch fasteners; and
   wherein the touch fasteners are disposed on the protrusions and recesses of the pieces such that when a protrusion of one piece is mated with a recess of an adjacent piece complimentary sides of the touch fastener are engaged to releasably hold the protrusion in the recess in a mated position.

4. The modular and reusable shipping container of claim 1, wherein the first and second locking bars each have at least two locking bar segments that are removably connected to adjust the length of the locking bar.

5. The modular and reusable shipping container of claim 1, further comprising:
   an RFID tag attached to one or more of the plurality of pieces.

6. The modular and reusable shipping container of claim 1, wherein the plurality of pieces includes one or more L-shaped corner pieces.

7. The modular and reusable shipping container of claim 1, wherein the plurality of pieces includes one or more edge forming pieces.

8. The modular and reusable shipping container of claim 1, wherein the plurality of pieces includes one or more primary wall pieces.

9. A modular and reusable shipping container comprising:
   a plurality of pieces, each having a rigid construction and being configured to connect with adjacent pieces to form walls of the shipping container, wherein each of the pieces are configured to connect with adjacent pieces by interlocking protrusions and corresponding recesses, wherein at least one protrusion of one piece is configured to mate with at least one recess of an adjacent piece, allowing secure connection of the pieces to form the walls of the shipping container;
   the plurality of pieces at least including a plurality of L-shaped corner pieces, a plurality of edge pieces, and a plurality of primary wall pieces;
   a closure piece having a locking mechanism, the locking mechanism configured to releasably engage with at least two of the plurality of pieces when the locking mechanism is operated to securely lock the pieces together;
   wherein the locking mechanism comprises:
   first and second locking bars extending outwardly from opposite side edges of the closure piece, the first and second locking bars are slidably connected to the closure piece for back-and-forth movement in a direction perpendicular to the side edges between retracted and extended positions;
   an actuator mounted to the closure piece, the actuator operatively connected to the first and second locking bars, the actuator operable to move the first and second locking bars between the extended and retracted positions; and
   wherein when the first and second locking bars are in the extended positions terminal ends of each locking bar are engaged with at least one piece of the plurality of pieces thereby locking the at least one piece to at least one other piece.

10. The modular and reusable shipping container of claim 9, wherein the plurality of edge pieces includes a plurality of corner edge pieces and linear edge pieces.

11. The modular and reusable shipping container of claim 9, wherein when the first and second locking bars are in the extended positions, terminal ends of each locking bar extend through a mated recess and protrusion of two connected pieces there by locking the protrusion in the recess.

12. The modular and reusable shipping container of claim 9, wherein:
the actuator has a pinon gear;
first and second gear racks operatively mated to the pinon gear;
wherein the first rod is attached to the first gear rack, and the second rod is attached to the second gear rack; and
wherein rotating the pinon in a first direction moves the first and second rods into the extended position and rotating the pinon a second direction opposite of the first direction moves the first and second rods into the retracted position.

13. The modular and reusable shipping container of claim 12, wherein the first rod is removably connected to the first gear rack and the second rod is removably connected to the second gear rack.

14. The modular and reusable shipping container of claim 12, wherein the pinon gear has a knob that is graspable by an operator to rotate the pinon gear to move the first and second rods between the extended and retracted positions.

15. The modular and reusable shipping container of claim 9, wherein the first and second locking bars each have at least two locking bar segments that are removably connected to adjust the length of the locking bar.

16. The modular and reusable shipping container of claim 9, further comprising:
an RFID tag attached to one or more of the plurality of pieces.

17. A modular and reusable shipping container comprising:
a plurality of pieces, each having a rigid construction and being configured to connect with adjacent pieces to form walls of the shipping container, wherein each of the pieces are configured to connect with adjacent pieces by interlocking protrusions and corresponding recesses, wherein at least one protrusion of one piece is configured to mate with at least one recess of an adjacent piece, allowing secure connection of the pieces to form the walls of the shipping container;
the plurality of pieces at least including a plurality of L-shaped corner pieces, a plurality of edge pieces, and a plurality of primary wall pieces;
a closure piece having a locking mechanism, the locking mechanism configured to releasably engage with at least two of the plurality of pieces when the locking mechanism is operated to securely lock the pieces together;
the locking mechanism comprising:
first and second locking bars extending outwardly from opposite side edges of the closure piece, the first and second locking bars are slidably connected to the closure piece for back-and-forth movement in a direction perpendicular to the side edges between retracted and extended positions;
an actuator mounted to the closure piece, the actuator operatively connected to the first and second locking bars, the actuator operable to move the first and second locking bars between the extended and retracted positions; and
wherein when the first and second locking bars are in the extended positions terminal ends of each locking bar are engaged with at least one piece of the plurality of pieces thereby locking the at least one piece to at least one other piece.

18. The modular and reusable shipping container of claim 17, further comprising:
an RFID tag attached to one or more of the plurality of pieces.

* * * * *